US012663925B2

(12) United States Patent
Bert

(10) Patent No.: US 12,663,925 B2
(45) Date of Patent: Jun. 23, 2026

(54) ATOMIC OPERATIONS IMPLEMENTED USING MEMORY SERVICES OF DATA STORAGE DEVICES

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 12 days.

(21) Appl. No.: 18/432,578

(22) Filed: Feb. 5, 2024

(65) Prior Publication Data

US 2024/0264750 A1 Aug. 8, 2024

Related U.S. Application Data

(60) Provisional application No. 63/483,822, filed on Feb. 8, 2023.

(51) Int. Cl.
*G06F 3/06* (2006.01)
*G06F 12/0815* (2016.01)

(52) U.S. Cl.
CPC .......... *G06F 3/0619* (2013.01); *G06F 3/0659* (2013.01); *G06F 3/0679* (2013.01); *G06F 12/0815* (2013.01)

(58) Field of Classification Search
CPC ............ G06F 12/0815; G06F 12/0868; G06F 3/0619; G06F 3/0659; G06F 3/0679
See application file for complete search history.

(56) References Cited

U.S. PATENT DOCUMENTS

| | | | | |
|---|---|---|---|---|
| 10,241,919 B2 * | 3/2019 | Wei | ........................ | G06F 3/0685 |
| 2014/0040550 A1 * | 2/2014 | Nale | .................... | G06F 13/4068 |
| | | | | 711/118 |
| 2017/0109089 A1 * | 4/2017 | Huang | .................. | G06F 3/0625 |
| 2017/0286329 A1 * | 10/2017 | Fernando | ............ | G06F 12/0813 |
| 2018/0059966 A1 * | 3/2018 | Lee | ......................... | G06F 13/28 |

* cited by examiner

*Primary Examiner* — Yong J Choe
(74) *Attorney, Agent, or Firm* — Greenberg Traurig

(57) ABSTRACT

A computing device having a computer express link (CXL) connection between a memory sub-system and a host system and a flag configured to indicate an atomic operation being in progress in the memory sub-system. Over the connection, the memory sub-system can attach a portion of its fast, random access memory as a memory device, and a non-volatile memory as a storage device. The flag is set in the memory device accessible to the host system via a cache-coherent memory access protocol, before execution of commands of the atomic operation. After the completion of the atomic operation, the flag is cleared off the memory device. During a recovery from an interruption, the host system can check the flag to decide whether to restart or start the atomic operation again, or undo the partially executed the atomic operation.

20 Claims, 8 Drawing Sheets

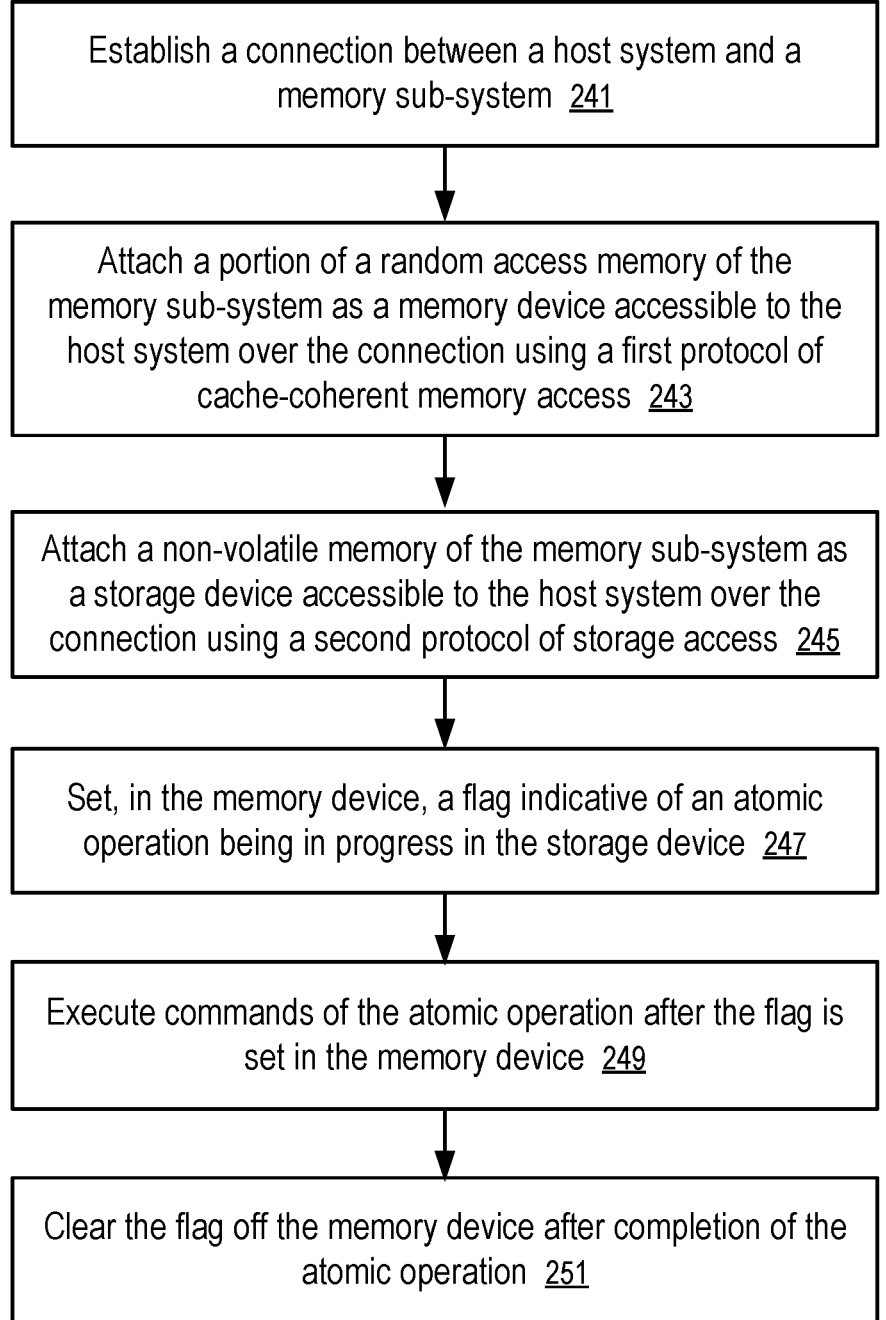

Establish a connection between a host system and a memory sub-system 241

Attach a portion of a random access memory of the memory sub-system as a memory device accessible to the host system over the connection using a first protocol of cache-coherent memory access 243

Attach a non-volatile memory of the memory sub-system as a storage device accessible to the host system over the connection using a second protocol of storage access 245

Set, in the memory device, a flag indicative of an atomic operation being in progress in the storage device 247

Execute commands of the atomic operation after the flag is set in the memory device 249

Clear the flag off the memory device after completion of the atomic operation 251

FIG. 8

ATOMIC OPERATIONS IMPLEMENTED USING MEMORY SERVICES OF DATA STORAGE DEVICES

RELATED APPLICATIONS

The present application claims priority to Prov. U.S. Pat. App. Ser. No. 63/483,822 filed Feb. 8, 2023, the entire disclosures of which application are hereby incorporated herein by reference.

TECHNICAL FIELD

At least some embodiments disclosed herein relate to memory systems in general, and more particularly, but not limited to memory systems configured to be accessible for memory services and storage services.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

FIG. 8 shows a method of atomic operations according to one embodiment.

DETAILED DESCRIPTION

Figure 1:
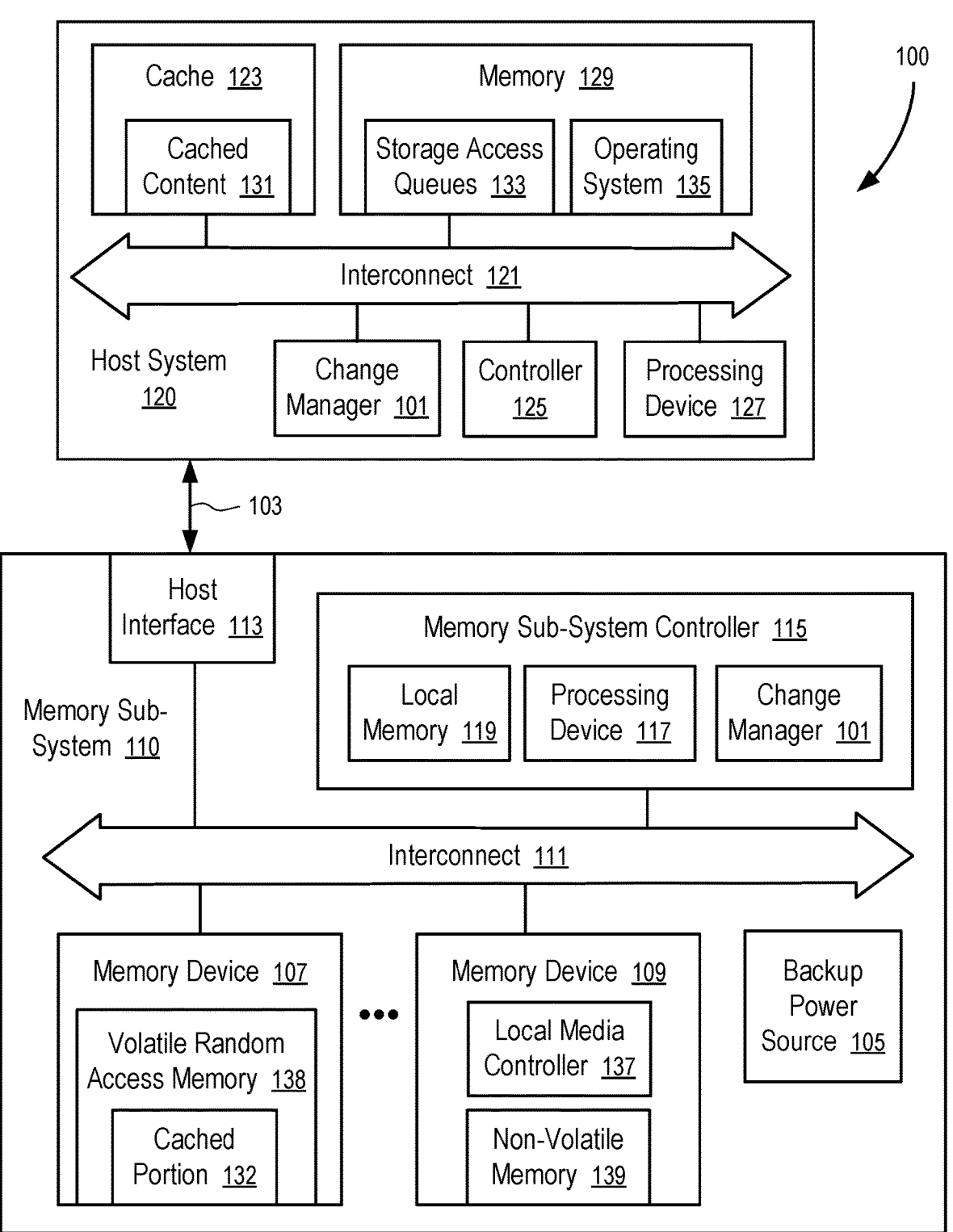
FIG. 1 illustrates an example computing system having a memory sub-system in accordance with some embodiments of the present disclosure.

At least some aspects of the present disclosure are directed to a solid-state drive (SSD) that can provide both memory services and storage services over a physical connection to a host system. The solid-state drive can allocate a portion of its fast memory (e.g., dynamic random access memory (DRAM)) and attach the allocated portion as a memory device to the host system. The memory device can be used to implement an atomic operation that is configured to either be performed in the solid-state drive in entirety or have the effect of being not performed.

For example, a host system and a memory sub-system (e.g., a solid-state drive (SSD)) can be connected via a physical connection according to a computer component interconnect standard of compute express link (CXL). Compute express link (CXL) includes protocols for storage access (e.g., cxl.io), and protocols for cache-coherent memory access (e.g., cxl.mem and cxl.cache). Thus, a memory sub-system can be configured to provide both storage services and memory services to the host system over the physical connection using compute express link (CXL).

A typical solid-state drive (SSD) is configured or designed as a non-volatile storage device that preserves the entire set of data received from a host system in an event of unexpected power failure. The solid-state drive can have volatile memory (e.g., SRAM or DRAM) used as a buffer in processing storage access messages received from a host system (e.g., read commands, write commands). To prevent data loss in a power failure event, the solid-state drive is typically configured with an internal backup power source such that, in the event of power failure, the solid-state drive can continue operations for a limited period of time to save the data, buffered in the volatile memory (e.g., SRAM or DRAM), into non-volatile memory (e.g., NAND). When the limited period of time is sufficient to guarantee the preservation of the data in the volatile memory (e.g., SRAM or DRAM) during a power failure event, the volatile memory as backed by the backup power source can be considered non-volatile from the point of view of the host system. Typical implementations of the backup power source (e.g., capacitors, battery packs) limit the amount of volatile memory (e.g., SRAM or DRAM) configured in the solid-state drive to preserve the non-volatile characteristics of the solid-state drive as a data storage device. When functions of such volatile memory are implemented via fast non-volatile memory, the backup power source can be eliminated from the solid-state drive.

When a solid-state drive is configured with a host interface that supports the protocols of compute express link, a portion of the fast, volatile memory of the solid-state drive can be optionally configured to provide cache-coherent memory services to the host system. Such memory services can be accessible via load/store instructions executed in the host system at a byte level (e.g., 64B or 128B) over the connection of computer express link. Another portion of the volatile memory of the solid-state drive can be reserved for internal use by the solid-state drive as a buffer memory to facilitate storage services to the host system. Such storage services can be accessible via read/write commands provided by the host system at a logical block level (e.g., 4 KB) over the connection of computer express link.

When such a solid-state drive (SSD) is connected via a computer express link connection to a host system, the solid-state drive can be attached and used both as a memory device and a storage device to the host system. The storage device provides a storage capacity addressable by the host system via read commands and write commands at a block level (e.g., for data records of a database); and the memory device provides a physical memory addressable by the host system via load instructions and store instructions at a byte level (e.g., for changes to data records of the database).

It is advantageous to configure a set of commands (e.g., write commands, erase commands) as an atomic operation to modify the content in the storage capacity of the solid-state drive (SSD). The set of commands can be configured to be executed in the solid-state drive either in entirety, even with the interruption of the execution of the commands (e.g., by a power failure event), or having the effect of not being executed at all.

For example, the host system can use the memory device, attached by the solid-state drive (SSD) over a computer express link (CXL) connection, to track the progress of the write operations of the atomic operation. The memory device can be used to store data usable to complete the set of commands of the atomic operation, or to remove the effect of a partial execution of the atomic operation.

For example, the host system can be configured to log the start of the atomic operation by setting an in-progress flag in the memory device using a cache-coherent memory access protocol over the computer express link connection. Optionally, the host system can also log the progress of execution of commands of the atomic operation. When the execution of the atomic operation is complete, the host system can clear the in-progress flag in the memory device.

If a power failure event interrupts the atomic operation, the presence of the in-progress flag in the memory device attached by the solid-state drive to the host system (and other data) can be preserved by the solid-state drive.

For example, the memory space provided by the solid-state drive over the computer express link connection can be configured as non-volatile from the point of view of the host system. The memory allocated by the solid-state drive to provide the memory services over the computer express link connection can be implemented via non-volatile memory, or via volatile memory backed with a backup power supply. The backup power supply is configured to be sufficient to guarantee that, in the event of disruption to the external power supply to the solid-state drive, the solid-state drive can continue operations to save the data from the volatile memory to the non-volatile storage capacity of the solid-state drive. Thus, in the event of unexpected power disruption, the data in the memory device attached by the solid-state drive to the host system is preserved and not lost.

After the power failure event, the host system can check for the in-progress flag in the memory device attached by the solid-state drive to the host system. If the in-progress flag has been cleared off the memory device, the atomic operation has been completed in entirety; and buffers are consistent. Otherwise, the host system can replay, or continue sending, the commands of the atomic operation to complete the atomic operation.

For example, the host system can record, into the memory device attached by the solid-state drive and in association with the in-progress flag set for the atomic operation, the set of write commands of the atomic operation with data to be written into the solid-state drive. If the power failure event interrupts the execution of the atomic operation, the host system can use the records in the memory device to restart or resume the execution of the atomic operation. For example, to meet database requirements under the atomicity, consistency, isolation, durability (ACID) test, the solid-state drive can be configured to guarantee that, in case of power failure, the atomic operation either entirely completed or not even started. For example, reading the data back from the solid-state drive after the power failure will either return new data or old data but not partially new and partially old data.

Optionally, the host system can track the progress of the write commands of the atomic operation. The in-progress flag can be configured to have the identification of one or more write commands, if any, of the atomic operation that have been completed. Thus, if the power failure event interrupts the execution of the atomic operation, the host system can use the records in the memory device to request the execution of the remaining write commands of the atomic operation that have not yet been completed, as identified by the in-progress flag. In a conventional database approach, a typical host system cannot continue with any operation after a power failure, as the entire memory context was lost in the power failure; and thus, the host system is configured to roll back to a last known good image (e.g., from checkpoint) and replay from scratch all the input/output operations recorded in log files, without the concept of resuming or continuing a set of an atomic operation having multiple writes.

Optionally, the host system can configure a set of storage access message queues in the memory device attached by the solid-state drive over the computer express link connection. The set of storage access message queues can be used by the host system to provide the write commands of the atomic operation. After the power failure event interrupts the execution of the atomic operation, the solid-state drive can automatically resume the execution of the write commands provided in the storage access message queues, such as the remaining write commands of an atomic operation.

In some implementations, when a power failure event occurs, the storage access message queues can have an incomplete set of commands of the atomic operation in the memory device attached by the solid-state drive over the computer express link connection. The host system can be configured to set an in-progress flag before entering any commands of the atomic operation into the storage access message queues; and the host system can clear the in-progress flag for the atomic operation after entering the complete set of write commands (and their data) into the storage access message queues (and the memory device).

In some implementations, the host system is capable of generating the remaining write commands (and their data) after a power failure event, following the entry of a partial set of write commands of an atomic operation into the storage access message queues. Thus, after the power failure event, the host system can continue adding write commands of the atomic operation to the storage access message queues in the memory device for the complete execution of the atomic operation in the solid-state drive.

In some implementations, it can be desirable to roll back a partially executed set of write commands of the atomic operation after an interruption (e.g., when the host system cannot complete the generation of the remaining write commands of the atomic operation after the power interruption). One or more recovery commands can be generated and placed in a recovery queue prior to the solid-state drive executing a write command of the atomic operation. Upon completion of the atomic operation, the recovery queue can be discarded.

For example, prior to writing new data into the storage capacity of the solid-state drive at a logical block address, the existing data at the logical block address can be retrieved and used to formulate a write command to reverse the effect of writing the new data at the logical block address. The command to write the existing data can be entered into the recovery queue prior to the execution of the command to write the new data.

In some implementations, writing new data at the logical block address is configured to be performed by the solid-state drive via mapping the logical block address to a new physical address in a flash translation layer, marking the memory cells at the old physical address of the logical block address as being no longer in use, and programming the memory cells at the new physical address of the logical block address to store the new data. For improved efficiency in rolling back the operation of writing the new data, the solid-state drive can store commands in the recovery queue to map the logical block address back to the old physical address, and mark the memory cells at the old physical address being used (e.g., by the recovery queue, instead of marking them as no longer in use) before programming the memory cells at the new physical address. Thus, if the host system decides to roll back the partially executed atomic operation, the solid-state drive can execute the commands in the recovery queue to remove the effects of the partial execution.

It is advantageous for a host system to use a communication protocol to query the solid-state drive about the memory attachment capabilities of the solid-state drive, such as whether the solid-state drive can provide cache-coherent memory services, what is the amount of memory that the solid-state drive can attach to the host system in providing memory services, how much of the memory attachable to provide the memory services can be considered non-volatile (e.g., implemented via non-volatile memory, or backed with a backup power source), what is the access time of the memory that can be allocated by the solid-state drive to the memory services, etc.

The query result can be used to configure the allocation of memory in the solid-state drive to provide cache-coherent memory services. For example, a portion of fast memory of the solid-state drive can be provided to the host system for cache-coherent memory accesses; and the remaining portion of the fast memory can be reserved by the solid-state drive for internal. The partitioning of the fast memory of the solid-state drive for different services can be configured to balance the benefit of memory services offered by the solid-state drive to the host system and the performance of storage services implemented by the solid-state drive for the host system. Optionally, the host system can explicitly request the solid-state drive to carve out a requested portion of its fast, volatile memory as memory accessible over a connection, by the host system using a cache-coherent memory access protocol according to computer express link.

For example, when the solid-state drive is connected to the host system to provide storage services over a connection of computer express link, the host system can send a command to the solid-state drive to query the memory attachment capabilities of the solid-state drive.

For example, the command to query memory attachment capabilities can be configured with a command identifier that is different from a read command; and in response, the solid-state drive is configured to provide a response indicating whether the solid-state drive is capable of operating as a memory device to provide memory services accessible via load instructions and store instructions. Further, the response can be configured to identify an amount of available memory that can be allocated and attached as the memory device accessible over the computer express link connection. Optionally, the response can be further configured to include an identification of an amount of available memory that can be considered non-volatile by the host system and be used by the host system as the memory device. The non-volatile portion of the memory device attached by the solid-state drive can be implemented via non-volatile memory, or volatile memory supported by a backup power source and the non-volatile storage capacity of the solid-state drive.

Optionally, the solid-state drive can be configured with more volatile memory than an amount backed by its backup power source. Upon disruption in the power supply to the solid-state drive, the backup power source is sufficient to store data from a portion of the volatile memory of the solid-state drive to its storage capacity, but insufficient to preserve the entire data in the volatile memory to its storage capacity. Thus, the response to the memory attachment capability query can include an indication of the ratio of volatile to non-volatile portions of the memory that can be allocated by the solid-state drive to the memory services. Optionally, the response can further include an identification of access time of the memory that can be allocated by the solid-state drive to cache-coherent memory services. For example, when the host system requests data via a cache-coherent protocol over the compute express link from the solid-state drive, the solid-state drive can provide the data in a time period that is not longer than the access time.

Optionally, a pre-configured response to such a query can be stored at a predetermined location in the storage device attached by the solid-state drive to the host system. For example, the predetermined location can be at a predetermined logical block address in a predetermined namespace. For example, the pre-configured response can be configured as part of the firmware of the solid-state drive. The host system can use a read command to retrieve the response from the predetermined location.

Optionally, when the solid-state drive has the capability of functioning as a memory device, the solid-state drive can automatically allocate a predetermined amount of its fast, volatile memory as a memory device attached over the computer express link connection to the host system. The predetermined amount can be a minimum or default amount as configured in a manufacturing facility of solid-state drives, or an amount as specified by configuration data stored in the solid-state drive. Subsequently, the memory attachment capability query can be optionally implemented in the command set of the protocol for cache-coherent memory access (instead of the command set of the protocol for storage access); and the host system can use the query to retrieve parameters specifying the memory attachment capabilities of the solid-state drive. For example, the solid-state drive can place the parameters into the memory device at predetermined memory addresses; and the host can retrieve the parameters by executing load commands with the corresponding memory addresses.

It is advantageous for a host system to customize aspects of the memory services of the memory sub-system (e.g., a solid-state drive) for the patterns of memory and storage usages of the host system.

For example, the host system can specify a size of the memory device offered by the solid-state drive for attachment to the host system, such that a set of physical memory addresses configured according to the size can be addressable via execution of load/storage instructions in the processing device(s) of the host system.

Optionally, the host system can specify the requirements on time to access the memory device over the compute express link (CXL) connection. For example, when the cache requests to access a memory location over the connection, the solid-state drive is required to provide a response within the access time specified by the host system in configuring the memory services of the solid-state drive.

Optionally, the host system can specify how much of the memory device attached by the solid-state drive is required to be non-volatile such that when an external power supply to the solid-state drive fails, the data in the non-volatile portion of the memory device attached by the solid-state drive to the host system is not lost. The non-volatile portion can be implemented by the solid-state drive via non-volatile memory, or volatile memory with a backup power source to continue operations of copying data from the volatile memory to non-volatile memory during the disruption of the external power supply to the solid-state drive.

Optionally, the host system can specify whether the solid-state drive is to attach a memory device to the host system over the compute express link (CXL) connection.

For example, the solid-state drive can have an area configured to store the configuration parameters of the memory device to be attached to the host system via the compute express link (CXL) connection. When the solid-state drive reboots, starts up, or powers up, the solid-state drive can allocate, according to the configuration parameters stored in the area, a portion of its memory resources as a memory device for attachment to the host system. After the solid-state drive configures the memory services according to the configuration parameters stored in the area, the host system can access, via the cache, through execution of load instructions and store instructions identifying the corresponding physical memory addresses. The solid-state drive can configure its remaining memory resources to provide storage services over the compute express link (CXL) connection. For example, a portion of its volatile random access memory can be allocated as a buffer memory reserved for the processing device(s) of the solid-state drive; and the buffer memory is inaccessible and non-addressable to the host system via load/store instructions.

When the solid-state drive is connected to the host system via a computer express link connection, the host system can send commands to adjust the configuration parameters stored in the area for the attachable memory device. Subsequently, the host system can request the solid-state drive to restart to attach, over the computer express link to the host system, a memory device with memory services configured according to the configuration parameters.

For example, the host system can be configured to issue a write command (or store commands) to save the configuration parameters at a predetermined logical block address (or predetermined memory addresses) in the area to customize the setting of the memory device configured to provide memory services over the computer express link connection.

Alternatively, a command having a command identifier that is different from a write command (or a store instruction) can be configured in the read-write protocol (or in the load-store protocol) to instruct the solid-state drive to adjust the configuration parameters stored in the area.

FIG. 1 illustrates an example computing system 100 that includes a memory sub-system 110 in accordance with some embodiments of the present disclosure. The memory sub-system 110 can include computer-readable storage media, such as one or more volatile memory devices (e.g., memory device 107), one or more non-volatile memory devices (e.g., memory device 109), or a combination of such.

In FIG. 1, the memory sub-system 110 is configured as a product of manufacture (e.g., a solid-state drive), usable as a component installed in a computing device.

The memory sub-system 110 further includes a host interface 113 for a physical connection 103 with a host system 120.

The host system 120 can have an interconnect 121 connecting a cache 123, a memory 129, a memory controller 125, a processing device 127, and a change manager 101 configured to use the memory services of the memory sub-system 110 to accumulate changes for storage in the storage capacity of the memory sub-system 110.

The change manager 101 in the host system 120 can be implemented at least in part via instructions executed by the processing device 127, or via logic circuit, or both. The change manager 101 in the host system 120 can use a memory device attached by the memory sub-system 110 to the host system 120 to store changes to a database, before the changes are written into a file in a storage device attached by the memory sub-system 110 to the host system 120. Optionally, the change manager 101 in the host system 120 is implemented as part of the operating system 135 of the host system 120, a database manager in the host system 120, or a device driver configured to operate the memory sub-system 110, or a combination of such software components.

The connection 103 can be in accordance with the standard of compute express link (CXL), or other communication protocols that support cache-coherent memory access and storage access. Optionally, multiple physical connections 103 are configured to support cache-coherent memory access communications and support storage access communications.

The processing device 127 can be a microprocessor configured as a central processing unit (CPU) of a computing device. Instructions (e.g., load instructions, store instructions) executed in the processing device 127 can access memory 129 via the memory controller (125) and the cache 123. Further, when the memory sub-system 110 attaches a memory device over the connection 103 to the host system, instructions (e.g., load instructions, store instructions) executed in the processing device 127 can access the memory device via the memory controller (125) and the cache 123, in a way similar to the accessing of the memory 129.

For example, in response to execution of a load instruction in the processing device 127, the memory controller 125 can convert a logical memory address specified by the instruction to a physical memory address to request the cache 123 for memory access to retrieve data. For example, the physical memory address can be in the memory 129 of the host system 120, or in the memory device attached by the memory sub-system 110 over the connection 103 to the host system 120. If the data at the physical memory address is not already in the cache 123, the cache 123 can load the data from the corresponding physical address as the cached content 131. The cache 123 can provide the cached content 131 to service the request for memory access at the physical memory address.

For example, in response to execution of a store instruction in the processing device 127, the memory controller 125 can convert a logical memory address specified by the instruction to a physical memory address to request the cache 123 for memory access to store data. The cache 123 can hold the data of the store instruction as the cached content 131 and indicate that the corresponding data at the physical memory address is out of date. When the cache 123 needs to vacate a cache block (e.g., to load new data from different memory addresses, or to hold data of store instructions of different memory addresses), the cache 123 can flush the cached content 131 from the cache block to the corresponding physical memory addresses (e.g., in the memory 129 of the host system, or in the memory device attached by the memory sub-system 110 over the connection 103 to the host system 120).

The connection 103 between the host system 120 and the memory sub-system 110 can support a cache-coherent memory access protocol. Cache coherence ensures that: changes to a copy of the data corresponding to a memory address are propagated to other copies of the data corresponding to the memory address; and load/store accesses to a same memory address are seen by processing devices (e.g., 127) in a same order.

The operating system 135 can include routines of instructions programmed to process storage access requests from applications.

In some implementations, the host system 120 configures a portion of its memory (e.g., 129) to function as queues 133 for storage access messages. Such storage access messages can include read commands, write commands, erase commands, etc. A storage access command (e.g., read or write) can specify a logical block address for a data block in a storage device (e.g., attached by the memory sub-system 110 to the host system 120 over the connection 103). The storage device can retrieve the messages from the queues 133, execute the commands, and provide results in the queues 133 for further processing by the host system 120 (e.g., using routines in the operating system 135).

Typically, a data block addressed by a storage access command (e.g., read or write) has a size that is much bigger than a data unit accessible via a memory access instruction (e.g., load or store). Thus, storage access commands can be convenient for batch processing a large amount of data (e.g., data in a file managed by a file system) at the same time and in the same manner, with the help of the routines in the operating system 135. The memory access instructions can be efficient for accessing small pieces of data randomly without the overhead of routines in the operating system 135.

The memory sub-system 110 has an interconnect 111 connecting the host interface 113, a controller 115, and memory resources, such as memory devices 107, . . . , 109.

The controller 115 of the memory sub-system 110 can control the operations of the memory sub-system 110. For example, the operations of the memory sub-system 110 can be responsive to the storage access messages in the queues 133, or responsive to memory access requests from the cache 123.

In some implementations, each of the memory devices (e.g., 107, . . . , 109) includes one or more integrated circuit devices, each enclosed in a separate integrated circuit package. In other implementations, each of the memory devices (e.g., 107, . . . , 109) is configured on an integrated circuit die; and the memory devices (e.g., 107, . . . , 109) can be configured in a same integrated circuit device enclosed within a same integrated circuit package. In further implementations, the memory sub-system 110 is implemented as an integrated circuit device having an integrated circuit package enclosing the memory devices 107, . . . , 109, the controller 115, and the host interface 113.

For example, a memory device 107 of the memory sub-system 110 can have volatile random access memory 138 that is faster than the non-volatile memory 139 of a memory device 109 of the memory sub-system 110. Thus, the non-volatile memory 139 can be used to provide the storage capacity of the memory sub-system 110 to retain data. At least a portion of the storage capacity can be used to provide storage services to the host system 120. Optionally, a portion of the volatile random access memory 138 can be used to provide cache-coherent memory services to the host system 120. The remaining portion of the volatile random access memory 138 can be used to provide buffer services to the controller 115 in processing the storage access messages in the queues 133 and in performing other operations (e.g., wear leveling, garbage collection, error detection and correction, encryption).

When the volatile random address memory 138 is used to buffer data received from the host system 120 before saving into the non-volatile memory 139, the data in the volatile random address memory 138 can be lost when the power to the memory device 107 is interrupted. To prevent data loss, the memory sub-system 110 can have a backup power source 105 that can be sufficient to operate the memory sub-system 110 for a period of time to allow the controller 115 to commit the buffered data from the volatile random access memory 138 into the non-volatile memory 139 in the event of disruption of an external power supply to the memory sub-system 110.

Optionally, the fast memory 138 can be implemented via non-volatile memory (e.g., cross-point memory); and the backup power source 105 can be eliminated. Alternatively, a combination of fast non-volatile memory and fast volatile memory can be configured in the memory sub-system 110 for memory services and buffer services.

The host system 120 can send a memory attachment capability query over the connection 103 to the memory sub-system 110. In response, the memory sub-system 110 can provide a response identifying: whether the memory sub-system 110 can provide cache-coherent memory services over the connection 103, what is the amount of memory that is attachable to provide the memory services over the connection 103, how much of the memory available for the memory services to the host system 120 is considered non-volatile (e.g., implemented via non-volatile memory, or backed with a backup power source 105), what is the access time of the memory that can be allocated to the memory services to the host system 120, etc.

The host system 120 can send a request over the connection 103 to the memory sub-system 110 to configure the memory services provided by the memory sub-system 110 to the host system 120. In the request, the host system 120 can specify: whether the memory sub-system 110 is to provide cache-coherent memory services over the connection 103, what is the amount of memory that is provided as the memory services over the connection 103, how much of the memory provided over the connection 103 is considered non-volatile (e.g., implemented via non-volatile memory, or backed with a backup power source 105), what is the access time of the memory is provided as the memory services to the host system 120, etc. In response, the memory sub-system 110 can partition its resources (e.g., memory devices 107, . . . , 109) and provide the requested memory services over the connection 103.

When a portion of the memory 138 is configured to provide memory services over the connection 103, the host system 120 can access a cached portion 132 of the memory 138 via load instructions and store instructions and the cache 123. The non-volatile memory 139 can be accessed via read commands and write commands transmitted via the queues 133 configured in the memory 129 of the host system 120.

Using the memory services of the memory sub-system 110 provided over the connection 103, the host system 120 can accumulate, in the memory of the subsystem (e.g., in a portion of the volatile random access memory 138), data identifying changes in a database. When the size of the accumulated change data is above a threshold, a change manager 101 can pack the change data into one or more blocks of data for one or more write commands addressing one or more logical block addresses. The change manager 101 can be implemented in the host system 120, or in the memory sub-system 110, or partially in the host system 120 and partially in the memory sub-system 110. The change manager 101 in the memory sub-system 110 can be implemented at least in part via instructions (e.g., firmware) executed by the processing device 117 of the controller 115 of the memory sub-system 110, or via logic circuit, or both.

Figure 2:
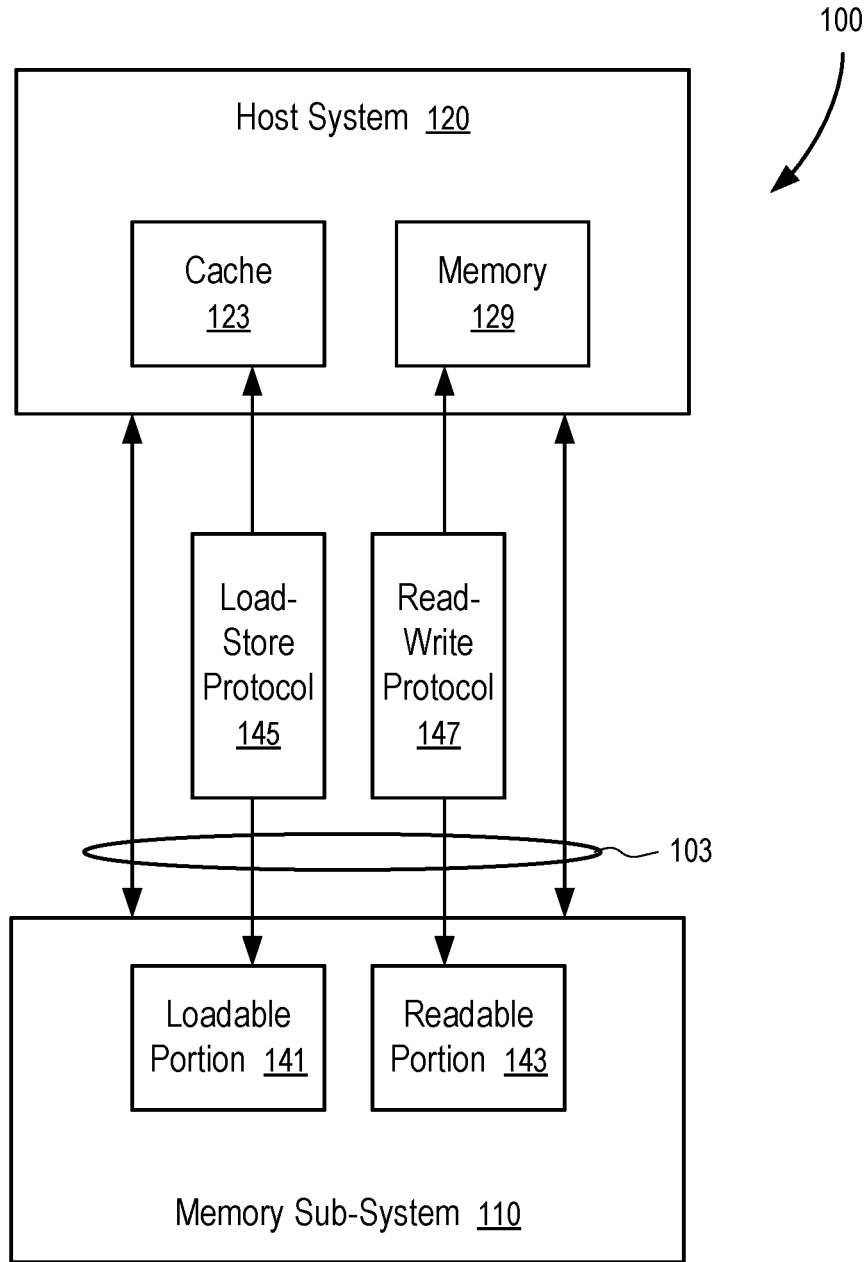
FIG. 2 shows a memory sub-system configured to offer both memory services and storage services to a host system over a physical connection according to one embodiment.

FIG. 2 shows a memory sub-system configured to offer both memory services and storage services to a host system over a physical connection according to one embodiment. For example, the memory sub-system 110 and the host system 120 of FIG. 2 can be implemented in a way as the computing system 100 of FIG. 1.

Figure 5:
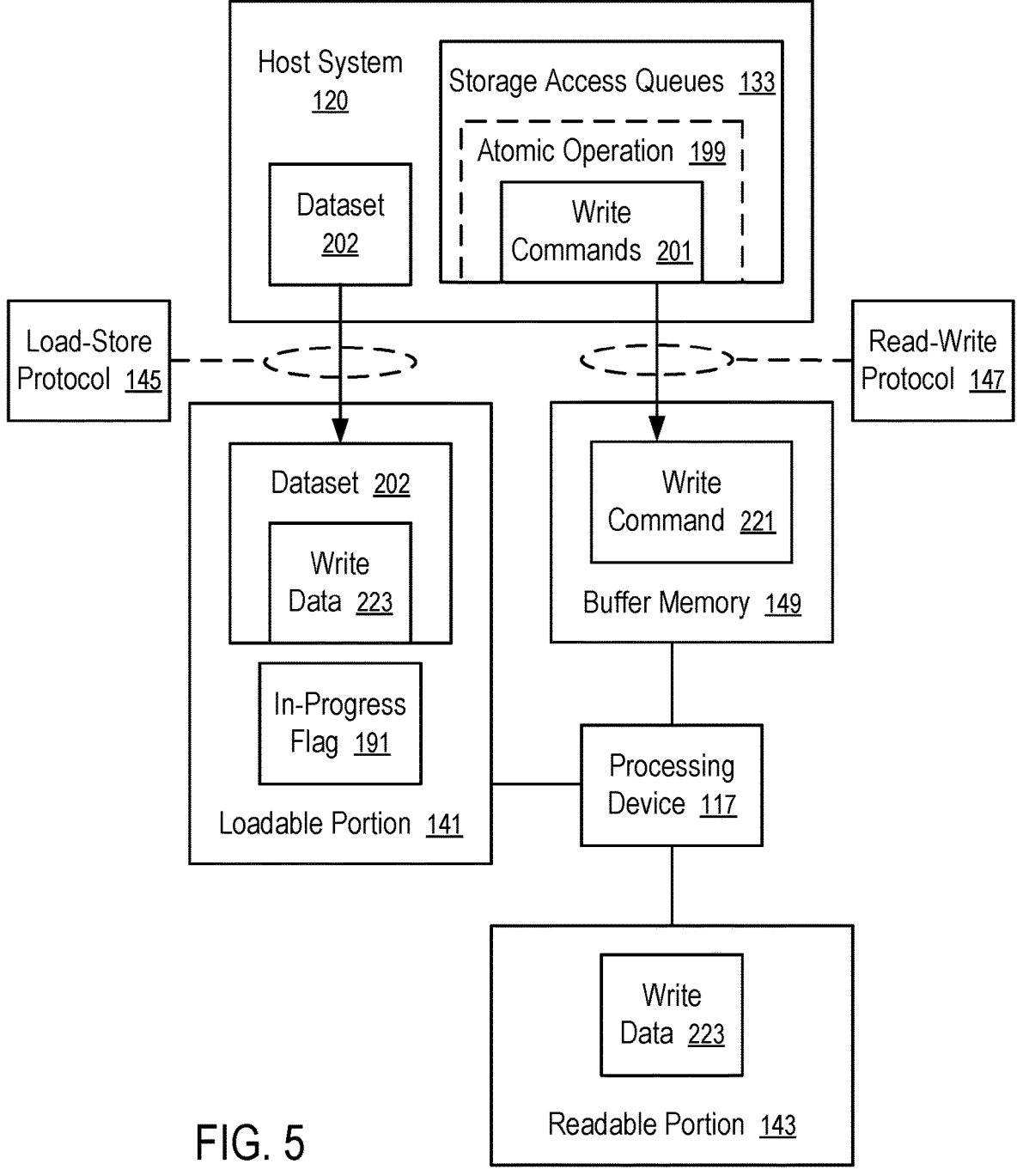
FIG. 5 shows the execution of an atomic operation of multiple write commands according to one embodiment.

In FIG. 2, the memory resources (e.g., memory devices 107, ..., 109) of the memory sub-system 110 are partitioned into a loadable portion 141 and a readable portion 143 (and an optional portion for buffer memory 149 in some cases, as in FIG. 5). A physical connection 103 between the host system 120 and the memory sub-system 110 can support a protocol 145 for load instructions and store instructions to access memory services provided in the loadable portion 141. For example, the load instructions and store instructions can be executed via the cache 123. The connection 103 can further support a protocol 147 for read commands and write commands to access storage services provided in the readable portion 143. For example, the read commands and write commands can be provide via the queues 133 config- ured in the memory 129 of the host system 120. For example, a physical connection 103 supporting a computer express link can be used to connect the host system 120 and the memory sub-system 110.

FIG. 2 illustrates an example of a same physical connec- tion 103 (e.g., computer express link connection) configured to facilitate both memory access communications according to a protocol 145, and storage access communications according to another protocol 147. In general, separate physical connections can be used to provide the host system 120 with memory access according to a protocol 145 for memory access, and storage access according to another protocol 147 for storage access.

Figure 3:
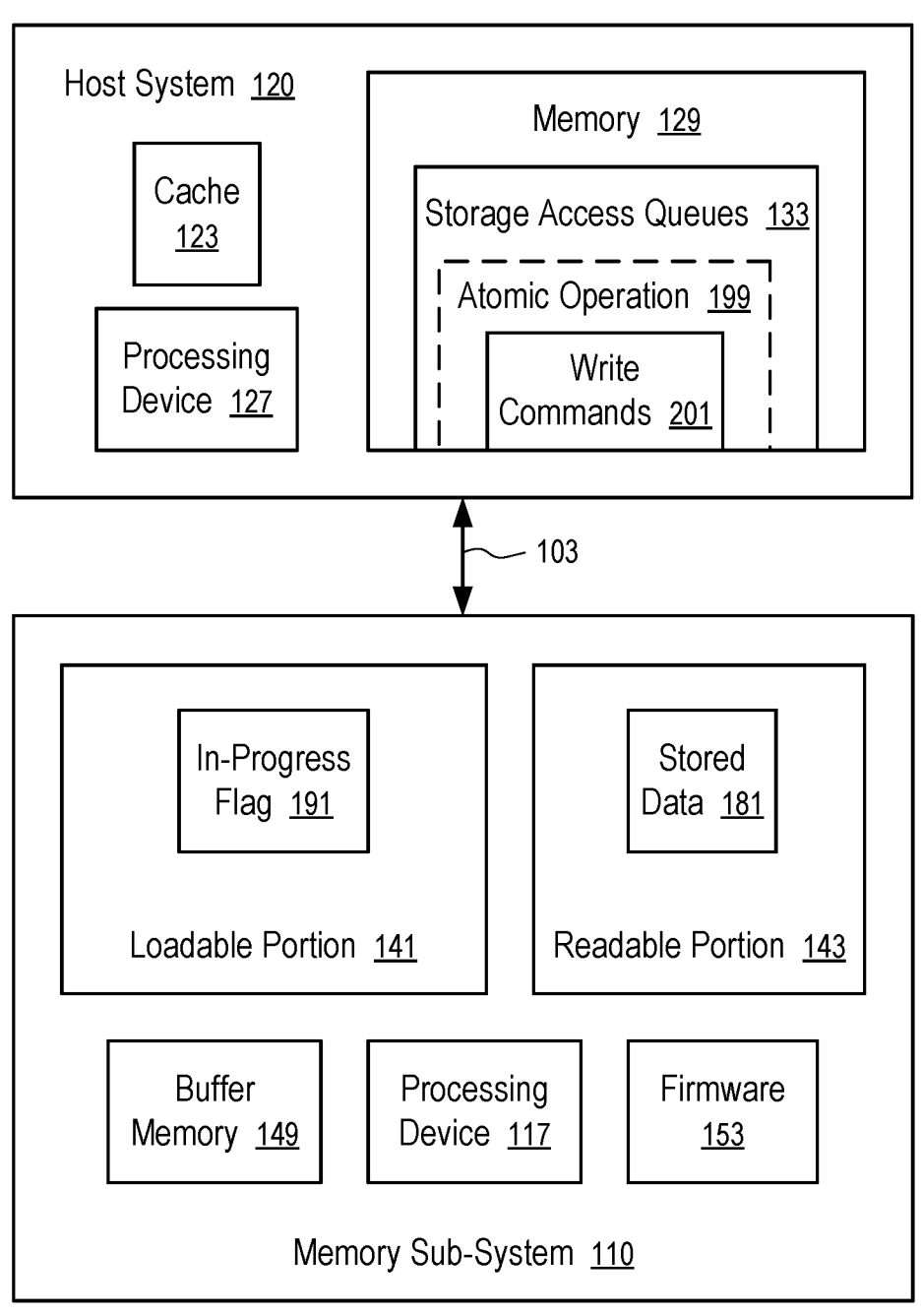
FIG. 3 show the use of the memory services of a data storage device to implement an in-process flag for an atomic operation of multiple write commands according to one embodiment.

FIG. 3 show the use of the memory services of a data storage device to implement an in-process flag for an atomic operation of multiple write commands according to one embodiment.

For example, the memory sub-system 110 of FIG. 3 can be implemented in a way as in FIG. 1 with a loadable portion 141 and a readable portion 143. As in FIG. 2, the loadable portion 141 is accessible to the host system 120 over the connection 103 via one protocol 145 for cache-coherent memory access; and the readable portion 143 is accessible to the host system 120 over the connection 103 via another protocol 147 for storage access.

In FIG. 3, the host system 120 can set, in the loadable portion 141, an in-progress flag 191 for an atomic operation 199 of changing data content (e.g., stored data 181) in the readable portion 143. The presence of the in-progress flag 191 indicates that the atomic operation 199 is incomplete.

For example, to request the memory sub-system 110 to write data into the readable portion 143, the host system 120 can enter a set of write commands 201 of the atomic operation 199 into the storage access queues 133 configured in a memory 129 of the host system 120. Before the host system 120 enters the write commands 201 of the atomic operation 199 into the queues 133, the host system 120 can set an in-progress flag 191 by executing one or more store instructions in the processing device 127. The execution of the store instructions causes the host system 120 to com- municate over the connection 103 using a cache-coherent protocol memory protocol 145 to store data representative of the in-progress flag 191 in the loadable portion 141.

After the write commands 201 are entered into the queues 133, the memory sub-system 110 can retrieve, using the storage access protocol 147 over the connection 103, the write commands 201 from the queues 133 in the memory 129 of the host system 120 for execution.

The host system 120 can monitor the progress of the memory sub-system 110 in processing the write commands 201 in the queues 133. After the host system 120 detects the completion of the execution of the entire set of write commands 201 in the memory sub-system 110, the host system 120 can execute one or more store instructions to clear the in-progress flag 191 for the atomic operation 199.

When the execution of the atomic operation 199 is interrupted (e.g., by a power interruption event, a crash of the host system 120), a portion of the content of the memory 129 can be lost.

During the recovery from the interruption, the host system 120 can check the loadable portion 141 for the in-progress flag 191. If the in-progress flag 191 is present in the loadable portion 141, the host system 120 can determine that an atomic operation 199 is incomplete. In response, the host system 120 can perform operations to complete the atomic operation 199, or roll back the effect of a partial execution of the atomic operation 199.

For example, the host system 120 can store data in the loadable portion 141 for the re-generation of the atomic operation 199. For example, the host system 120 can store a copy of the write commands 201 in the loadable portion 141 prior to entering the write commands 201 in the queues 133 for processing by the memory sub-system 110. In response to the detection of the in-progress flag 191 during the recovery from the interruption, the host system 120 can enter the write commands 201 of the atomic operation 199 into the queues 133 for re-execution by the memory sub- system 110 such that the atomic operation 199 is performed in entirety.

Optionally, the in-progress flag 191 can be configured to track the completion statuses of the individual write com- mands 201 in the atomic operation 199. During the recovery from the interruption, the host system 120 can identify a subset of the write commands 201 of the atomic operation 199 that have the status of incomplete, as identified by the in-progress flag 191; and the host system 120 can enter the subset of incomplete write commands of the atomic opera- tion 199 into the queue 133 without re-entering the com- pleted write commands of the atomic operation 199.

In some implementations, the host system 120 can con- figure the storage access queues 133 in the loadable portion 141, instead of in the memory 129 of the host system 120. The memory sub-system 110 can be configured to retrieve the write commands 201 of the atomic operation 199 from the loadable portion 141 locally, instead of from the memory 129 of the host system 120. During the recovery from the interruption, the host system 120 can instruct the memory sub-system 110 to continue execution of the commands from the queue 133 configured in the loadable portion 141.

In some applications, the queues 133 can have an incom- plete set of write commands (e.g., 201) of the atomic operation 199. For example, at the time of the interruption, the host system 120 has not yet generated the completed set of write commands (e.g., 201) in some cases. In other cases, the queues 133 do not have a sufficient capacity to store the entire set of write commands (e.g., 201) of the atomic operation 199.

Optionally, the host system 120 can store, in the loadable portion 141, data usable to roll back the effect of a partial execution of the atomic operation 199. For example, prior to a write command 201 being entered to write new data to replace the previously stored data 181 in the readable portion 143, the host system 120 can enter a read command to retrieve the stored data 181 and store a copy of the stored data 181 in the loadable portion 141. To roll back of the effect of the write command 201, the host system 120 can request the memory sub-system 110 to execute a write command to write the stored data 181 back into the readable portion 143.

In some implementations, the memory sub-system 110 is configured to store data (e.g., in the loadable portion 141) usable to roll back the effect of a write command 201. For example, in response to a determination that a write command 201 is part of an atomic operation 199 associated with the in-progress flag 191, the memory sub-system 110 (e.g., configured via the firmware 153) can store the data usable to roll back the effect of the write command 201, prior to or in association with execution of the write command 201. Optionally, the memory sub-system 110 can be configured to track the completion statuses of the write commands 201 of the atomic operation 199 for the host system 120.

For example, the firmware 153 can include a flash translation layer configured to map logical block addresses used in write commands (e.g., 201) to identify locations of write operations to physical addresses of memory cells in the memory sub-system 110. To write new data at a logical block address in execution of a write command 201 of the atomic operation 199, the flash translation layer (e.g., configured as part of the firmware 153) can allocate a free block of memory cells, and map the logical block address to the physical address of the allocated block of memory cells. The memory sub-system 110 can program the allocated memory cells to store the new data. Instead of marking the memory cells previously used to store data at the logical block address as not in use (and thus erasable in a garbage collection operation for reuse to store further data), the memory sub-system 110 can store data (e.g., in the loadable portion 141 or another location) to identify the physical address of the memory cells storing the prior data (e.g., 181) of the logical block address. In response to a request from the host system 120 can roll back the effect of the executed write command 201, the memory sub-system 110 can adjust the flash translation layer to map the logical block address to the physical address of the memory cells storing the prior data (e.g., 181) and mark the memory cells allocated and programmed to store the new data of the write command 201 as not in use (and thus erasable in a garbage collection operation).

Figure 4:
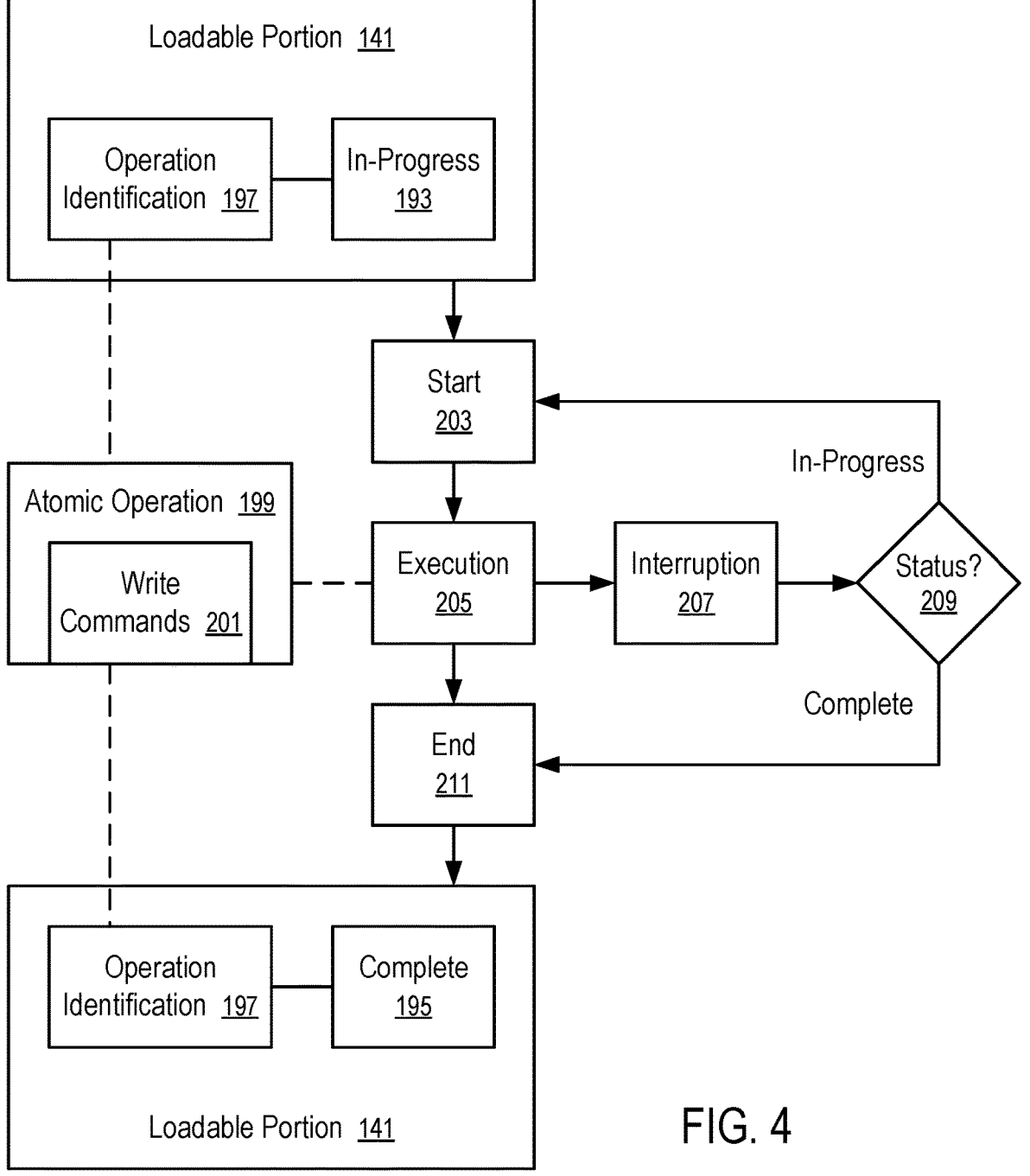
FIG. 4 illustrates an atomic operation of multiple write commands implemented according to one embodiment.

FIG. 4 illustrates an atomic operation of multiple write commands implemented according to one embodiment. For example, the in-progress flag 191 of FIG. 3 can be implemented and used in a way as illustrated in FIG. 4.

In FIG. 4, an operation identification 197 is configured to represent an atomic operation 199 having a set of commands (e.g., 201). The execution of the commands (e.g., 201) of the atomic operation 199 can change the data 181 stored in the readable portion 143 of the memory sub-system 110.

Prior to the start 203 of the execution 205 of the atomic operation 199, an indicator of in-progress 193 is stored in association with the operation identification 197 in the loadable portion 141.

For example, the combination of the operation identification 197 and the indicator of in-progress 193 can represent the in-progress flag 191.

For example, the host system 120 can set the in-progress flag 191 in the loadable portion 141 over the connection 103 using the cache-coherent protocol 145.

For example, the queues 133 can have a command configured to identify a start 203 of a list of commands 201 of an atomic operation 199; and in response the memory sub-system 110 can set the in-progress flag 191 in the loadable portion 141 using an internal connection within the memory sub-system 110 to the loadable portion 141.

During the execution 205 of the atomic operations 199, the memory sub-system 110 can fetch the commands 201 of the atomic operation 199 (e.g., from the queues 133 configured in the memory 129 of the host system 120 using a storage access protocol 147 over the connection 103).

If an interruption of the execution of the atomic operation 199 occurs (e.g., as result of power outage, a crash of the host system 120), the host system 120 can check the status of the atomic operation 199 at block 209 during a recovery operation responsive to the interruption 207.

If the loadable portion 141 has the indicator of in-progress 193 for the operation identification 197, the host system 120 can instruct the memory sub-system 110 to restart or start 203 the atomic operation 199.

Optionally, the indicator of in-progress 193 identifies a current command being executed in the list of commands 201 programmed for the atomic operation 199. Commands listed before the current command have the status of having been completed, and commands listed after the current command have the status of having not yet been executed. Thus, the restart or start 203 can skip the commands before the current command identified by the indicator of in-progress 193.

After the execution of the entire set of commands 201 of the atomic operation 199, the host system 120 can change the indicator of in-progress 193 to an indicator of complete 195 over the connection using the cache-coherent memory access protocol 145. Optionally, the host system 120 can delete the in-progress flag 191 from the loadable portion 141.

In some implementations, the queues 133 can have a command configured to identify an end 211 of a list of commands 201 of the atomic operation 199; and in response the memory sub-system 110 can clean the in-progress flag 191 from the loadable portion 141 using an internal connection within the memory sub-system 110 to the loadable portion 141.

In some implementations, the host system 120 is configured to pre-generate the data to be written via the atomic operation 199 and buffer the data in the loadable portion 141, as illustrated in FIG. 5.

FIG. 5 shows the execution of an atomic operation of multiple write commands according to one embodiment.

In FIG. 5, the host system 120 generates the entire dataset 202 to be written via an atomic operation 199 into the readable portion 143 of the memory sub-system 110 (e.g., as in FIG. 3 and FIG. 4).

Prior to entering the commands 201 of the atomic operation 199 into the storage access queues 133 configured in the memory 129 of the host system 120, the host system 120 can store the dataset 202 into the loadable portion 141 of the memory sub-system 110 using a cache-coherent memory access protocol 145. The dataset 202 can be preserved during an interruption 207 and use to restart or start 203 the execution of the atomic operation 199 after the interruption 207.

The memory sub-system 110 can retrieve the write commands 201 of the atomic operation 199 for execution.

For example, after retrieving a write command 221 of the atomic operation 199 from the queues 133 using a storage access protocol 147 over the connection 103 between the memory sub-system 110 and the host system 120, the memory sub-system 110 can be configured (e.g., via the firmware 153) to execute the write command 221 using the processing device 117 of the memory sub-system 110.

Optionally, the memory sub-system 110 can be configured to retrieve the data 223, to be written via the write command 221, from the loadable portion 141 directly (e.g., instead of via the queues 133).

Optionally, the memory sub-system 110 can update the in-progress flag 191 to include an indication of the completion of the write command 221, after the processing device 117 finishes execution of the write command 221. Alternatively, the host system 120 can be configured to update the in-progress flag 191 to include the completion status of the write command 221. For example, after the write command 221 and the data 223 to be written via the write command 221 are retrieved from the queues 133, the host system 120 can assume that the write command 221 will be eventually executed in the memory sub-system 110, even with an interruption 207.

The in-progress flag 191 can be used in a recovery operation to restart or start the atomic operation 199.

Figure 6:
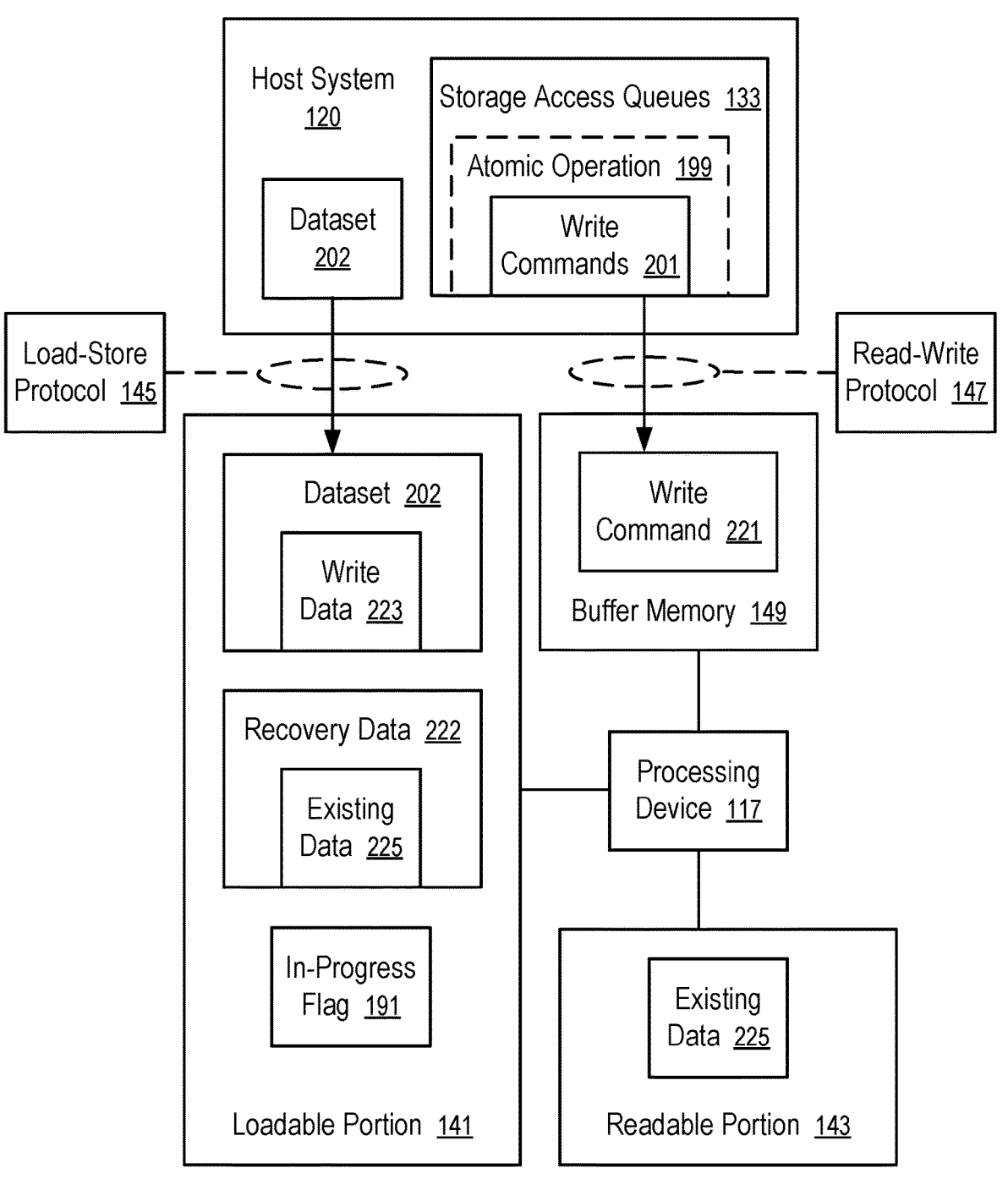
FIG. 6 shows the execution of an atomic operation of multiple write commands with an option to undo according to one embodiment.

In some implementations, the memory sub-system 110 and the host system 120 are further configured to generate recovery data usable to roll back or undo the execution of the write commands (e.g., 221) of the atomic operation 199, as in FIG. 6.

FIG. 6 shows the execution of an atomic operation of multiple write commands with an option to undo according to one embodiment.

For example, the host system 120 can provide a dataset 202 and write commands 201 of an atomic operation 199 in a way similar to the execution of an atomic operation 199 in FIG. 5.

Further, before the execution of a write command 221 of the atomic operation 199, the memory sub-system 110 can update the recovery data 222 stored in the loadable portion 141 to include the existing data 225 at a location to be written by the write command 221 to facilitate the rolling back the effect of executing the write command 221.

Alternatively, before entering the write command 221 into the queues 133, the host system 120 can enter a read command to retrieve the existing data 225. The host system 120 can update, over the connection 103 between the memory sub-system 110 and the host system 120 using the cache-coherent memory access protocol 145, the recovery data 222 to include the existing data 225. To roll back the effect of executing the write command 221, the host system 120 can issue a write command to write the existing data 225 back to the readable portion 143 at the same location being written by the write command 221.

In some implementations, the write command 221 is configured to write at a logical block address that is translated into the physical addresses of a block of memory cells. Instead of reading and copying the existing data 225 from the logical block address of the write command 221 to the loadable portion 141, the memory sub-system 110 can be configured via the firmware 153 to store, in the recovery data 222 the mapping between the logical block address and the physical addresses of the block of memory cells storing the existing data 225. To roll back or undo the write commands 221, the memory sub-system 110 can store the mapping of the logical block address with the physical addresses of the block of memory cells storing the existing data 225.

Thus, the in-progress flag 191 and the recovery data 222 can be used in a recovery operation to resume, restart or start the atomic operation 199, or to roll back or undo the atomic operation 199.

In some implementations, the host system 120 does not have the entire dataset 202 of the atomic operation 199 at the time of the start 203 of the execution 205 of the atomic operation 199. After an interruption 207, if the host system 120 is unable to regenerate the atomic operation 199 and its data, the host system 120 can instruct the memory sub-system 110 to roll back or undo the atomic operation 199 using the recovery data 222.

Figure 7:
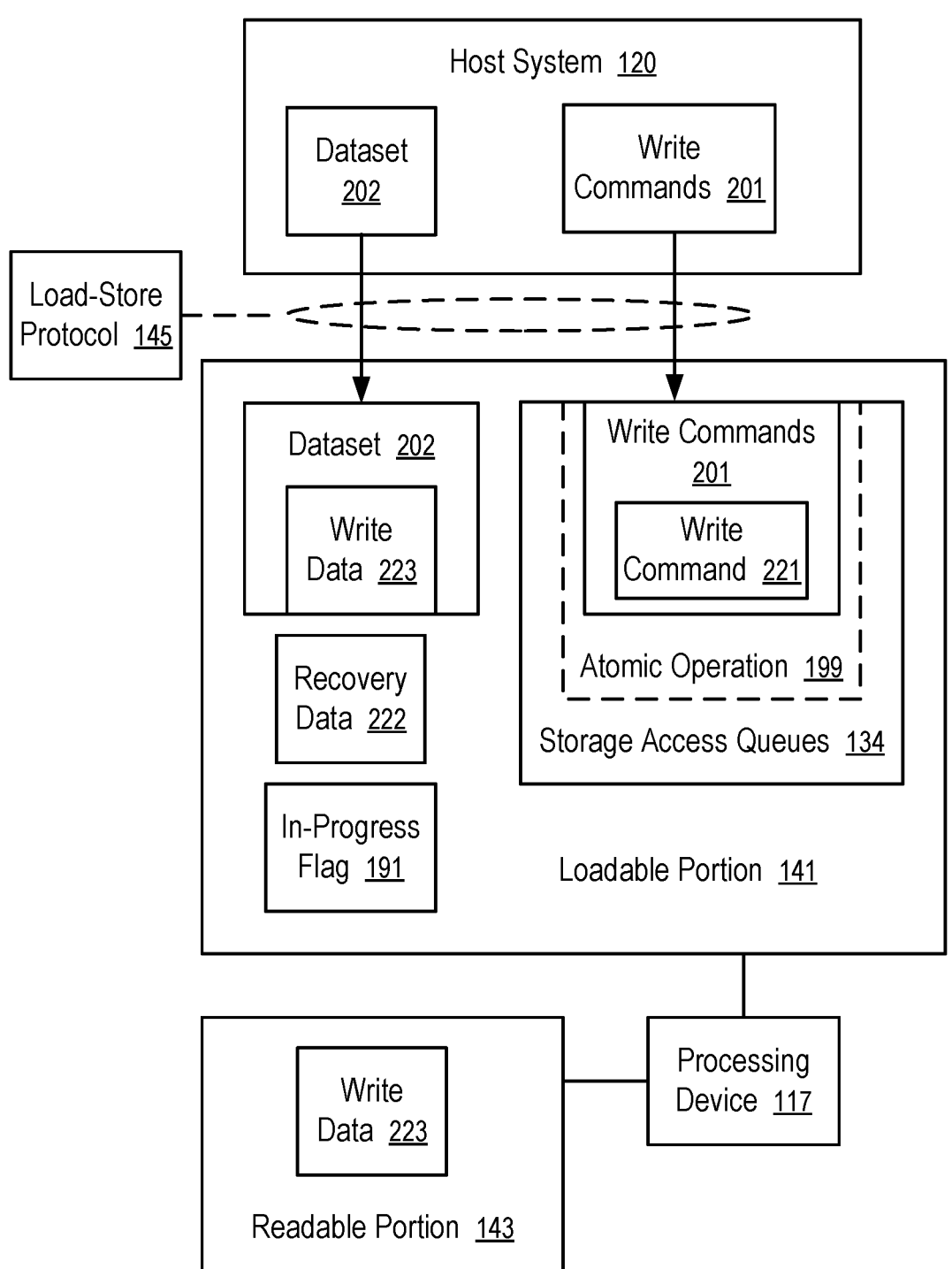
FIG. 7 shows the execution of an atomic operation of multiple write commands using the memory services of a data storage device according to one embodiment.

Optionally, the host system 120 can use message queues configured in the loadable portion 141 to send the write commands 221 of an atomic operation 199 to the memory sub-system 110, as in FIG. 7.

FIG. 7 shows the execution of an atomic operation of multiple write commands using the memory services of a data storage device according to one embodiment.

In FIG. 7, the host system 120 is configured to store commands 201 of an atomic operation 199 into storage access queues 134 configured in the loadable portion 141 of the memory sub-system 110, instead of using queues 133 configured in a memory 129 of the host system 120.

The host system 120 can store the dataset 202 of the write commands 201 and the write commands into the loadable portion 141 using the cache-coherent memory access protocol 145 over the connection 103 between the memory sub-system 110 and the host system 120, instead of the storage access protocol 147. Optionally, the dataset 202 can also be configured in messages entered in the queues 134.

When the processing device 117 of the memory sub-system 110 retrieves a write command (e.g., 221) of the atomic operation for execution, the processing device 117 can obtain the data 223 to be written by the write command 221 via a local connection within the memory sub-system 110 from the loadable portion 141. Since the host system 120 can provide the commands 201 and data (e.g., 223) of the atomic operation 199 using the cache-coherent memory access protocol 145 and the loadable portion 141, it is not necessary for the memory sub-system 110 to use the storage access protocol 147 on the connection 103 for the execution of the atomic operation 199.

In FIG. 5, FIG. 6 and FIG. 7, the memory sub-system 110 can be implemented in a way as in FIG. 1 with a loadable portion 141 and a readable portion 143 as in FIG. 2. The host system 120 and the memory sub-system 110 in FIG. 7 can set and update the in-progress flag 191 to handle recovery from an interruption as in FIG. 4. Further, the host system 120 and the memory sub-system 110 can update recovery data 222 (e.g., in response to a write command 221) to facilitate rolling back or undoing the atomic operation 199.

FIG. 8 shows a method of atomic operations according to one embodiment. For example, the method of FIG. 8 can be implemented in computing systems 100 of FIG. 1 and FIG. 2 with the techniques of FIG. 3 to use the memory services of a memory sub-system 110 to provide an indicator of an atomic operation 199 being in progress.

At block 241, a connection 103 is established between a host system 120 and a memory sub-system 110.

For example, the memory sub-system 110 (e.g., a solid-state drive) and the host system 120 can be connected via at least one physical connection 103.

For example, the connection 103 can be implemented in accordance with a standard of computer express link (CXL) to support both a cache-coherent memory access protocol 145 and a storage access protocol 147.

At block 243, a portion 141 of a random access memory 138 of the memory sub-system 110 is attached as a memory device accessible to the host system 120 over the connection 103 using a first protocol 145 of cache-coherent memory access.

For example, the memory sub-system 110 can optically carve out a portion (e.g., loadable portion 141) of its fast random access memory (e.g., 138) as a memory device attached to the host system 120 over the connection 103. The memory sub-system 110 can reserve another portion of its fast random access memory (e.g., 138) as a buffer memory 149 for internal use by its processing device(s) (e.g., 117).

Optionally, the memory sub-system 110 can have a backup power source 105 designed to guarantee that data stored in at least a portion of volatile random access memory 138 is saved in a non-volatile memory 139 when the power supply to the memory sub-system 110 is disrupted. Thus, such a portion of the volatile random access memory 138 can be considered non-volatile in the memory services to the host system 120. Alternatively, the random access memory 138 of the memory sub-system 110 allocated for the loadable portion 141 can be implemented using a non-volatile memory.

At block 245, a non-volatile memory 139 (e.g., readable portion 143) of the memory sub-system 110 is attached as a storage device accessible to the host system 120 over the connection 103 using a second protocol 147 of storage access.

For example, the memory sub-system 110 can have a portion (e.g., readable portion 143) of its memory resources (e.g., non-volatile memory 139) configured as a storage device attached to the host system 120 over the connection 103.

At block 247, a flag 191 indicative of an atomic operation 199 being in progress 193 in the storage device (e.g., readable portion 143) is set in the memory device (e.g., loadable portion 141).

At block 249, the memory sub-system 110 executes commands 201 of the atomic operation 199 after the flag 191 is set in the memory device (e.g., loadable portion 141).

For example, the host system 120 can enter the commands 201 of the atomic operation 199 in storage access queues 133 (or 134) after setting the in-progress flag 191.

Optionally, the host system 120 can set the in-progress flag 191 in response to the memory sub-system 110 retrieving any of the command 201 of the atomic operation 199 from the storage access queues 133 configured in the memory 129 of the host system 120.

At block 251, the flag is cleared off the memory device (e.g., loadable portion 141) after completion 195 of the atomic operation 199.

There can be an interruption 207 to the execution 205 of the commands 201 of the atomic operation 199. For example, the interruption 207 can result from a power outage, a crash of the host system 120, etc. If the interruption 207 is detected, the host system 120 can perform an operation of recovery from the interruption 207, including checking the memory device (e.g., loadable portion 141) for the flag 191.

If the in-progress flag 191 is set in the loadable portion 141, the atomic operation 199 is incomplete. The host system 120 can decide to complete the partially executed atomic operation 199, or undo the effect of the partially executed atomic operation 199.

For example, the host system 120 can restart or start again an execution of the commands 201 of the atomic operation 199 in response to a determination, during the operation of recovery from the interruption 207, that the in-progress flag 191 is set in the memory device (e.g., the loadable portion 141).

Optionally, after the execution of a first write command 221 of the atomic operation 199, the in-progress flag 191 can be updated, in the memory device (e.g., the loadable portion 141), to indicate completion of the first write command 221. For example, the memory sub-system 110 can be configured to update the in-progress flag 191 after fetching and executing the first write command 221.

Alternatively, the host system 120 can update the in-progress flag 191 to indicate the completion of the first write command 221. For example, when the memory sub-system 110 is designed to finish execution of a write command after fetching the command and its data from storage access queues 133, the host system 120 can update the in-progress flag 191 in response to the memory sub-system 110 retrieving the first write command 221 from the host system 120 (e.g., using the storage access protocol 147 over the connection 103). Alternatively, the host system 120 can update the in-progress flag 191 to indicate the completion status of the first write command 221 after the host system 120 receives a message confirming the completion of the first write command 221 without errors.

When the in-progress flag 191 indicates that the first write command 221 has been complete but the atomic operation 199 has incomplete commands, the host system 120 can identify a portion of the commands 201 of the atomic operation 199 that are identified as incomplete by the in-progress flag 191. During the operation of recovery from the interruption 207, the host system 120 can start an execution of the identified portion of the commands 201 of the atomic operation 199, skipping the commands (e.g., 221) that have been executed in the memory sub-system 110.

Optionally, recovery data 222 is generated in the memory device (e.g., loadable portion 141) prior to the executing of the first write command 221 of the atomic operation 199. The recovery data 222 is usable to undo the execution of the first write command 221.

For example, the recovery data 222 can include a copy of existing data 225 at a location being written by the first write command 221. To undo the execution of the first write command 221, the existing data 225 can be written back to the same location.

In some implementations, the first write command 221 is configured to write at a logical block address. The memory sub-system 110 is configured to execute the first write command 221 by remapping the logical block address from a first block of memory cells of the memory sub-system 110 to a second block of memory cells of the memory sub-system 110, and programming the second block of memory cells to store new data written via the first write command 221. In such implementations, the recovery data 222 can include an identification of the association between the logical block address and the first block of memory cells to delay the erasure of the first block of memory cells. To undo the first write command using the recovery data, the memory sub-system 110 can map the logical block address back to the first block of memory cells of the memory sub-system 110, which stores the existing data 225; and then the second block of memory cells can be erased.

Optionally, the host system 120 configures storage access queues 133 in a memory 129 of the host system 120 and provides the commands 201 of the atomic operations 199 to the memory sub-system 110 via the storage access queues 133. The memory sub-system 110 can retrieve the commands 201 over the connection 103 using the second protocol 147 of storage access.

Alternatively, the host system 120 configures storage access queues 134 in the memory device (e.g., loadable portion 141) attached by the memory sub-system 110 to the host system 120. The host system 120 can provide the commands 201 of the atomic operations 199 into the storage access queues 134 over the connection 103 using the first protocol 145 of cache-coherent memory access. The memory sub-system 110 can retrieve the commands 201 from the queues 134 locally without using the connection 103.

Optionally, the host system 120 stores data (e.g., 223) to be written by the commands (e.g., 221) of the atomic operation 199 in the memory device (e.g., loadable portion 141) (e.g., in the queues 134 or another location). Thus, the host system 120 does not have to provide the data (e.g., 223) over the connection 103 using the second protocol 147 of storage access.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 127) and a software stack executed by the processor chipset. The processor chipset can include one or more cores, one or more caches (e.g., 123), a memory controller (e.g., controller 125) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 113. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system 120 and the memory sub-system 110. The host system 120 can further utilize an NVM express (NVMe) interface to access components (e.g., memory devices 109) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 127 of the host system 120 can be, for example, a microprocessor, a central processing unit (CPU), a processing core of a processor, an execution unit, etc. In some instances, the controller 125 can be referred to as a memory controller, a memory management unit, and/or an initiator. In one example, the controller 125 controls the communications over a bus coupled between the host system 120 and the memory sub-system 110. In general, the controller 125 can send commands or requests to the memory sub-system 110 for desired access to memory devices 109, 107. The controller 125 can further include interface circuitry to communicate with the memory sub-system 110. The interface circuitry can convert responses received from the memory sub-system 110 into information for the host system 120.

The controller 125 of the host system 120 can communicate with the controller 115 of the memory sub-system 110 to perform operations such as reading data, writing data, or erasing data at the memory devices 109, 107 and other such operations. In some instances, the controller 125 is integrated within the same package of the processing device 127. In other instances, the controller 125 is separate from the package of the processing device 127. The controller 125 and/or the processing device 127 can include hardware such as one or more integrated circuits (ICs) and/or discrete components, a buffer memory, a cache memory, or a combination thereof. The controller 125 and/or the processing device 127 can be a microcontroller, special purpose logic circuitry (e.g., a field programmable gate array (FPGA), an application specific integrated circuit (ASIC), etc.), or another suitable processor.

The memory devices 109, 107 can include any combination of the different types of non-volatile memory components and/or volatile memory components. The volatile memory devices (e.g., memory device 107) can be, but are not limited to, random-access memory (RAM), such as dynamic random-access memory (DRAM) and synchronous dynamic random-access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 109 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 109 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 109 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 109 can be based on any other type of non-volatile memory, such as read-only memory (ROM), phase change memory (PCM), self-selecting memory, other chalcogenide based memories, ferroelectric transistor random-access memory (FeTRAM), ferroelectric random-access memory (FeRAM), magneto random-access memory (MRAM), spin transfer torque (STT)-MRAM, conductive bridging RAM (CBRAM), resistive random-access memory (RRAM), oxide based RRAM (OxRAM), negative-or (NOR) flash memory, and electrically erasable programmable read-only memory (EE-PROM).

A memory sub-system controller 115 (or controller 115 for simplicity) can communicate with the memory devices 109 to perform operations such as reading data, writing data, or erasing data at the memory devices 109 and other such operations (e.g., in response to commands scheduled on a command bus by controller 125). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 109. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 109. The controller 115 can further include host interface circuitry to communicate with the host system 120 via the physical host interface. The host interface circuitry can convert the commands received from the host system into command instructions to access the memory devices 109 as well as convert responses associated with the memory devices 109 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 109.

In some embodiments, the memory devices 109 include local media controllers 137 that operate in conjunction with the memory sub-system controller 115 to execute operations on one or more memory cells of the memory devices 109. An external controller (e.g., memory sub-system controller 115) can externally manage the memory device 109 (e.g., perform media management operations on the memory device 109). In some embodiments, a memory device 109 is a managed memory device, which is a raw memory device combined with a local controller (e.g., local media controller 137) for media management within the same memory device package. An example of a managed memory device is a managed NAND (MNAND) device.

In one embodiment, an example machine of a computer system within which a set of instructions, for causing the machine to perform any one or more of the methodologies discussed herein, can be executed. In some embodiments, the computer system can correspond to a host system (e.g., the host system 120 of FIG. 1) that includes, is coupled to, or utilizes a memory sub-system (e.g., the memory sub-system 110 of FIG. 1) or can be used to perform the operations discussed above (e.g., to execute instructions to perform operations corresponding to operations described with reference to FIG. 1). In alternative embodiments, the machine can be connected (e.g., networked) to other machines in a LAN, an intranet, an extranet, and/or the internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random-access memory (DRAM) such as synchronous DRAM (SDRAM) or Rambus DRAM (RDRAM), static random-access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and/or within the processing device during execution thereof by the computer system, the main memory and the processing device also constituting machine-readable storage media. The machine-readable medium, data storage system, and/or main memory can correspond to the memory subsystem 110 of FIG. 1.

In one embodiment, the instructions include instructions to implement functionality discussed above (e.g., the operations described with reference to FIG. 1). While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random-access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random-access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
establishing a connection between a host system and a memory sub-system;
attaching a portion of a random access memory of the memory sub-system as a memory device accessible to the host system over the connection using a first protocol of cache-coherent memory access;
attaching a non-volatile memory of the memory sub-system as a storage device accessible to the host system over the connection using a second protocol of storage access;
setting, in the memory device, a flag indicative of an atomic operation being in progress in the storage device;
executing commands of the atomic operation after the flag is set in the memory device; and
clearing the flag off the memory device after completion of the atomic operation;
wherein the connection is in accordance with a standard of computer express link (CXL).

2. The method of claim 1, wherein the method further comprises:
detecting an interruption the executing of the commands of the atomic operation; and
performing an operation of recovery from the interruption, including checking the memory device for the flag.

3. The method of claim 2, further comprising:
starting an execution of the commands of the atomic operation in response to a determination, during the operation of recovery from the interruption, that the flag is set in the memory device.

4. The method of claim 2, further comprising:
executing a first write command of the atomic operation; and
updating, in the memory device, the flag to indicate completion of the first write command.

5. The method of claim 4, wherein the updating is in response to the memory sub-system retrieving the first write command from the host system.

6. The method of claim 4, wherein the updating is after the memory sub-system completes an execution of the first write command.

7. The method of claim 4, further comprising, in response to a determination, during the operation of recovery from the interruption, that the flag is set in the memory device:
identifying a portion of the commands of the atomic operation being identified as incomplete by the flag; and
starting an execution of the portion of the commands of the atomic operation.

8. The method of claim 4, further comprising:
generating, in the memory device and prior to the executing of the first write command of the atomic operation, recovery data usable to undo the executing of the first write command.

9. The method of claim 8, wherein the recovery data includes a copy of data at a location being written by the first write command.

10. The method of claim 8, wherein the first write command is configured to write at a logical block address; the first write command is executed via remapping the logical block address from a first block of memory cells of the memory sub-system to a second block of memory cells of the memory sub-system, and programming the second block of memory cells to store data written via the first write command; and the recovery data includes an identification of association between the logical block address and the first block of memory cells.

11. The method of claim 8, further comprising:
undoing, using the recovery data, the first write command in response to a determination, during the operation of recovery from the interruption, that the flag is set in the memory device.

12. A memory sub-system, comprising:
a host interface operable on a connection to a host system;
a volatile memory, wherein the memory sub-system is operable to allocate a portion of the volatile memory to provide memory services to the host system over the connection using a first protocol of cache-coherent memory access;
a non-volatile memory operable to provide storage services to the host system over the connection using a second protocol of storage access; and
a controller configured to:
set, in the volatile memory, a flag indicative of an atomic operation being in progress in the non-volatile memory;
executing commands of the atomic operation after the flag is set in the volatile memory; and
clear the flag off the volatile memory after completion of the atomic operation;
wherein the connection is a computer express link (CXL) connection.

13. The memory sub-system of claim 12, wherein the host system is configured to store the commands of the atomic operation in the volatile memory using the first protocol of cache-coherent memory access; and the controller is configured to retrieve the commands of the atomic operation from the volatile memory.

14. The memory sub-system of claim 13, further comprising:
a backup power source configured to be sufficient to at least allow the controller to continue operations to preserve content in the volatile memory into the non-volatile memory in response to an interruption in an external power supply to the memory sub-system.

15. The memory sub-system of claim 14, wherein the controller is further configured to update the flag to indicate completion of a first write command of the atomic operation after an execution of the first write command.

16. The memory sub-system of claim 15, wherein the controller is further configured to generate, prior to the execution of the first write command, recovery data usable to undo the execution of the first write command.

17. The memory sub-system of claim 16, wherein the controller is configured to:

determine a logical block address of the first write com-
mand;

remap the logical block address from a first block of
memory cells of the non-volatile memory to a second
block of memory cells of the non-volatile memory;

program the second block of memory cells to store data
written via the first write command; and identify, in the recovery data, association between the
logical block address and the first block of memory
cells.

18. A non-transitory computer storage medium storing
instructions which, when executed in a computing system,
cause the computing system to perform a method, compris-
ing:

establishing a connection between a host system of the
computing system and a memory sub-system of the
computing system;

setting, in a portion of the memory sub-system configured
to provide memory services over the connection using a first protocol of cache-coherent memory access, a flag
indicative of an atomic operation being in progress in
the memory sub-system, before an execution of com-
mands of the atomic operation;

clearing the flag off the portion of the memory sub-system
after completion of the atomic operation; and configuring storage access queues in a memory of the host
system.

19. The non-transitory computer storage medium of claim
18, wherein the method further comprises:

entering the commands of the atomic operation into the
storage access queues after the setting of the flag;

wherein the memory sub-system is configured to access
the storage access queues over the connection using a
second protocol of storage access.

20. The non-transitory computer storage medium of claim
19, wherein the connection is a computer express link (CXL)
connection.

* * * * *